United States Patent

Thuillier

[15] 3,683,070

[45] Aug. 8, 1972

[54] ANTIHYPERTENSIVE COMPOSITIONS

[72] Inventor: Yvonne Thuillier, Paris, France

[73] Assignee: Albert Rolland S.A., Paris, France

[22] Filed: Nov. 13, 1970

[21] Appl. No.: 89,469

[30] Foreign Application Priority Data

May 2, 1967 France..................20,359/67

Related U.S. Application Data

[63] Continuation-in-part of Ser. No. 724,253, April 25, 1968, abandoned.

[52] U.S. Cl................................................424/103
[51] Int. Cl. ............................................A61k 17/08
[58] Field of Search......................................424/103

[56] References Cited

UNITED STATES PATENTS

3,282,788   11/1966   Daniels et al..............424/103

OTHER PUBLICATIONS

Hamilton et al., J. of Biological Chemistry 233, No. 2, pp. 528– 529 (8/58).
Doolittle, The Techology of Solvents and Plasticizers p. 528 (1954).
Scheflan et al., The Handbook of Solvents p. 587– 588 (1954).

*Primary Examiner*—Albert T. Meyers
*Assistant Examiner*—Norman A. Drezin
*Attorney*—Hane, Baxley & Spiecens

[57] ABSTRACT

Antihypertensive fractions are obtained from kidneys by a triple extraction procedure with acetone at pH about 4, diethyl ether, and finally sec-butanol at pH about 5. A very active product having a prolonged effect is obtained.

4 Claims, No Drawings

ANTIHYPERTENSIVE COMPOSITIONS

This is a continuation-in-part application of U.S. Pat. application Ser. No. 724 253 filed on Apr. 25, 1968 now abandoned.

This invention relates to the extraction of antihypertensive compositions from kidneys.

Attempts have been made to isolate from kidneys hypotensive or antihypertensive factors. One known technique gives kidney extracts which are capable of generally lowering the blood pressure. In this technique, described by Grollman et al [J. Biol. Chem. 134, 115 – 121 (1940)], kidney extracts which show a lowering effect on the blood pressure in animals in experimental hypertension, are prepared by a process based essentially upon the following stages: extraction of the kidneys with hydrochloric acid; precipitation of inert proteins at a pH value of about 4 with sodium carbonate; filtration and reacidification to a pH value of about 2–3, and precipitation of an active principle with ammonium sulphate or sodium chloride. The active principle may be concentrated by extraction with acetone or with alcohol before or after the saline precipitation.

Recently Hamilton and Grollman [J. Biol. Chem., 233, 528–9 (1958)] have proposed another method of preparation of renal extracts which reduce the blood pressure in experimental hypertension. This method comprises extracting ground fresh pig kidneys with acetone and water acetone mixtures, concentrating in vacuo the combined aqueous acetone extracts, treating with petroleum ether and extracting the aqueous lower layer thus obtained with sec-butanol, the purification of the active extract being carried out by counter-current distribution between water and sec-butanol.

Subsequent methods involve the same principles or are generally based upon extraction of the kidney in saline solution.

However, the known methods have not made it possible to isolate a sufficiently active anti-hypertensive fraction which has a sufficient duration of action to be utilized in therapeutics. Moreover, the method of extraction is lengthy and necessitates multiple stages which are disadvantageous on an industrial scale.

The present invention provides a process for preparing a kidney extract having anti-hypertensive activity, by which it is possible to obtain a very active final extract of prolonged duration of action. The process of the present invention also involves a reduced number of stages and can readily be carried out with little cost on an industrial scale.

The process of the present invention for the isolation of an antihypertensive fraction from kidneys comprises:

(i) concentrating in vacuo from about 1/9 to 1/30 of their volume the combined extracts obtained by treating 1 kg of mammalian kidney with 2 liters of acetone at a pH of about 4.0, subjecting the filtered residue to at least one extraction with a mixture of 440 ml of acetone and 220 ml of water, (ii) treating at least once the concentrate thus obtained with 10 to 50 ml of diethyl ether, (iii) distilling off in vacuo the diethyl ether from the combined solutions, (iv) extracting at a pH of about 5,0 at least once the residual solution with 10 to 50 ml of sec-butanol, and, (v) concentrating or recovering the active extract from the combined sec-butanol solutions by a method known per se, each extraction being performed at a temperature maintained between 0° and + 5 °C, and each concentration carried out in vacuo at a temperature of about 35° – 40 °C.

It is not necessary to readjust a pH at about 4 and respectively at about 5 after the first extraction with acetone and respectively sec-butanol.

The final concentration of the extract may be carried out by various methods. Thus, the solution in sec-butanol may be partially evaporated, water added, and the mixture finally evaporated to the desired concentration.

It is also possible to employ for the final concentration one or two cross-linked dextran ion exchange resins, for example the resins marketed under the name "Sephadex" by Pharmacia, Uppsala, Sweden.

The extractions are carried out at from 0° to + 5 ° C, for example in the neighborhood of + 2 ° C, in all the stages, and the concentrations are carried out in vacuo at a temperature of about 35°– 40 ° C.

It is essential to use sec-butanol for the final extraction. Other alcohols, including other butanols and their mixtures, cannot be used. It has been demonstrated by chromatography and ultra-violet spectroscopy that the type of butanol used affects the nature of the product and that it is only with sec-butanol that the final product is entirely free of unwanted proteins, polypeptides and peptides.

The antihypertensive kidney extract obtained according to the process of the invention is characterized by a fluorescence when exposed to ultra-violet rays for a wave length of 259 m$\mu$. Pharmacological assays have shown that, in the absence of such a fluorescence at 259 m$\mu$ the extract either does not present any antihypertensive activity, or possesses a very weak activity. When sec-butanol contains traces of n-butanol, the extract is inactive, and no fluorescence occurs.

The 259 m$\mu$-fluorescence only appears after the first sec-butanolic extraction and is always observed in the pure solid extract when dissolved in water of organic solvents. Modification of the nature of only one extraction solvent in the process does not provide said fluorescence, as shown in the comparison example.

The antihypertensive extract of the invention comprises, according to analysis, purine amino-acid compounds, thiols-disulphides (compounds permitting an R—SH or R—S—S—R bond according to their oxidation degree), reducing sugars and deoxyribonucleosides.

The kidneys used as starting material may be any mammalian kidneys, preferably pig's kidney. It is also possible to use, e.g., the kidneys of bullocks, sheep, dogs or rabbits. Either the whole kidney or only the medulla of the kidney may be employed.

The properties of extractants used may be varied. Preferably for 10 kg of kidney, there may be employed as solvents and adjuvants in the new process 28.800 liters of acetone, 32 ml of concentrated HCl, 900 ml of diethyl ether, 2 liters of sec-butyl alcohol and 4.700 liters of distilled water. With 10 kg of kidney, are obtained from about 7.5 g to 12 g of antihypertensive extract. These proportions may, of course, be varied.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be an encapsulating material. In powders, the carrier is a finely divided solid which is in admixture with the finely divided compound. In the tablet the compound is mixed with carrier having the necessary binding properties in suitable proportions and compacted in the shape and size desired. The powders and tablets preferably contain from 1 to 95 percent by weight of the active ingredient. Suitable solid carriers are magnesium carbonate, magnesium stearate, talc, sugar, lactose, pectin, dextrin, starch, gelatin, adraganth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions or physiological saline solutions for parenteral injection. Liquid preparations can also be formulated in solution in aqueous polyethylene glycol solutions, or in oil. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation is in unit dosage form. In such form, the preparation is subdivided in the unit doses containing appropriate quantities of the compound, the unit dosage form can be a packaged preparation, the package containing discrete quantities of preparation, for example, packeted powders of vials or ampules.

Preferably, the kidney extract according to the invention is administered to humans by injection. Each injectable ampule generally contains from about 50 to about 80 mg of lactose and from about 50 to about 20 mg (respectively) of kidney extract, these ingredients being dissolved in 5 ml of physiological saline solutions (pH 6.8 – 7.2) By injectable route, the method of treatment of human hypertension comprises daily administering a dose from 40 to 100 mg of kidney extract (i.e., one to four ampoules according to the active dose they contain) for at least 15 days and preferably for 20 days. For the preferred daily dose which is 60 mg, three injections each of 20 mg of kidney extract are recommended.

EXAMPLE 1

10 kg of pig kidney are ground, and 20 liters of acetone, to which 32 ml of pure hydrochloric acid have been added, are added thereto. The solution obtained is chilled to about + 2 °C. The mixture is agitated with compressed air to homogenize it and refrigerated overnight. The following day, it is filtered through gauze and through folded filter papers, if possible in a refrigerator. The residues are taken up in a mixture of 4.400 liters of acetone and 2.200 liters of water, stirred and refrigerated overnight. The following day, the produce is refiltered and re-extracted by the same quantity of the same solution as above, and again refrigerated overnight. The following day, after filtration, the three extracts obtained are mixed, and the mixture is concentrated in vacuo at 30 ° C to about 3 liters of liquid, returned into the refrigerator overnight and then filtered.

The filtrate is then subjected to three successive extractions with 300 ml of diethyl ether. The ether is driven off in vacuo, and the residual solution is treated with about 2 liters of secondary butanol. In practice, an extraction with 500 ml is first effected and then six extractions with 250 ml. The sec-butanolic extracts are mixed, dried, and concentrated to about 300 ml. An equal volume of distilled water is added and the product is reconcentrated to 300 – 350 ml. The pH is adjusted to 6 – 6.6 and the product obtained is lyophilized.

EXAMPLE 2

1 kg of pig kidney is subjected to the following operations: It is extracted with 2 liters of acetone, to which 3.2 ml of pure hydrochloric acid at + 2 ° C have been added, for one night, and filtered through gauze. The residues obtained are again subjected to two further extractions with a mixture of 440 ml of acetone and 220 ml of water and kept at + 2 ° C for one night. The residues are removed. The acetone extracts thus obtained are mixed, filtered through folded filter papers and concentrated at 35 ° C in vacuo to about 350 ml. A concentrated solution is obtained which is kept for one night at + 2 ° C and then filtered through folded filter papers.

The filtered solution is treated three times with one tenth of its volume of diethyl ether (i.e., 30 ml of ether in each instance), and the ethered extracts are combined and concentrated. The residual solution obtained is extracted with secondary butanol, 20 times with 11 ml of butanol at each extraction. The combined sec-butanol extracts are evaporated to 30 ml, to the sec-butanolic fraction thus obtained an equal volume of water is added, and the mixture is then concentrated to 30 ml.

EXAMPLE 3

10 kg of pig kidney is subjected to the general extraction treatment of Example 1. The extraction is carried out with 20 liters of acetone to which 32 ml of pure hydrochloric acid have been added, and the mixture is concentrated to two liters.

The treatment with diethyl ether comprises two extractions with 200 ml each time. The ethereal extracts are combined and concentrated, and a series of extractions is performed with secondary butanol, on the residual solution using one extraction with 500 ml of secondary butanol and 6 extractions with 240 ml of secondary butanol. The sec-butanol extract is evaporated and concentrated to 300 ml, 300 ml of water are then added and the product is concentrated to 350 ml.

The solids content of the final extract obtained represents 3.80 percent by weight of the kidney.

EXAMPLE 4

Using the general procedure of Example 1, 10 kg of pig kidney is extracted with 20 liters of acetone, to which 32 ml of pure hydrochloric acid have been added. The combined extracts are concentrated to 1.100 liters, and then extracted three times with 110 ml of diethyl ether each time. The ethereal extracts are combined and concentrated. Eight extractions are then effected on the concentrate obtained using 250 ml of secondary butanol each time. After concentration of the combined sec-butanol extracts to 300 ml, 300 ml of water are added and the product is then concentrated to 350 ml. Extract 1 is thus obtained.

The operation is repeated with a further 10 kg of pig kidney, which is extracted with 20 liters of acetone to which 32 ml of pure hydrochloric acid have been added, and the mixture is concentrated to 2 liters and extracted with 200 ml of diethyl ether. The ether is distilled off and light extractions are effected on the residual solution with 250 ml of secondary butanol each time. After concentration of the combined sec-butanol extracts, 2 × 300 ml of water are added and the product is then concentrated to 250 ml (to eliminate traces of sec-butanol). Extract 2 is thus obtained.

By combining extracts 1 and 2, an extract having a solids content corresponding to 4 percent by weight of the kidneys used is obtained.

EXAMPLE 5

Using the general procedure of Example 1, 10 kg of pig kidney are extracted with 20 liters of acetone to which 32 ml of pure hydrochloric acid have been added, and the extract is concentrated to 1.100 liters. In another operation, 11 kg of pig kidney are extracted with 22 liters of acetone to which 35.2 ml of pure hydrochloric acid have been added, and the extract is concentrated to 900 ml.

The two concentrated acetone extracts are combined, their total volume being 2 liters. The mixture is extracted with 200 ml of diethyl ether and the ethered extracts are concentrated. The residual solution is extracted with secondary butanol, twice with 500 ml of sec-butanol and five times with 400 ml of sec-butanol.

The combined sec-butanol extracts are concentrated to 600 ml, and 300 ml of water are added. The mixture is concentrated to 600 ml and again evaporated to remove traces of sec-butanol. The volume is thus brought to 470 ml. The solids content corresponds to 4.87 percent by weight of the kidneys. The extract is diluted to 3.5 percent solids content (650 ml) and 22.75 g of lactose (3.5 percent by weight) are added.

The following pharmacological tests were made with the antihypertensive fraction of kidney produced in accordance with the present invention.

The activity of the new extract was checked by comparison with known products under the conditions described below. The following conclusions were reached:

1. The new kidney extract brings about a reduction of pressure of 1 to 3 units (maximum systolic pressure), 30 to 45 minutes after the injection of a given dose.
2. Only the duration of the action depends upon the dose employed.
3. The injections do not cause any undesirable side effects in animals.

These conclusions arise out of tests made on batches of experimentally hypertensed monkeys (in renal hypertension), each weighing from 4 to 6 kg. The pressure measurements were made on Giono-Chevil-Lard-Krauthammer oscillometer. The units mentioned are in cm.Hg. The intraperitoneal injections were made with the active contents of three to eight lyophilisation flagons dissolved in 5 ml of physiological saline, each flagon containing about 70 mg of kidney extract.

With the same equipment as above, tests were made to determine the consequences of treatment with the new kidney extract. In this respect, two series of measurements were made: (1) One series of measurements with a strong active dose, 90 mg/kg, in the first injection, the subsequent injections being of 30 mg/kg every day for one week. (2) Another series of measurements with a relatively weak active dose, 45 mg/kg, and then successive injections of 15 mg/kg per day.

The results obtained were as follows: For the first series of measurements, before the injections of the second day, there is observed a distinct lowering of the blood pressure (2 units in the case of systolic pressure), which is accentuated on the following days, proceeding to a reduction of 4 units after the third day. The animal is then in hypotension. After the injections have been stopped, the pressure reduction is maintained for more than 15 days after the last injection. During the first week after the injections have been stopped, a maximum drop of 3 to 4 units in the case of systolic pressure is observed. This reduction even reaches 5 units in the case of diastolic pressure. The animal is still in hypotension. A gradual increase of the pressure is then observed, and the pressure becomes stabilized, but at a lower value than the initial pressure. Between the last injection and the stabilization, a period of about fifteen days elapses. Multiplication of the tests of the first series of measurements led to the conclusion that the final stabilization always takes place at a value below the initial pressure. In the tests carried out, the final value of the pressure was 1 unit lower in the case of systolic pressure and 2 units lower in the case of diastolic pressure.

In the second series of measurements, after an attack dose of 45 mg/kg, one dose of 15 mg/kg of active product was injected for four days before the injections are stopped. At the second day, the pressure decreases, but in this case the maximum decrease is two units in the case of systolic pressure and three units in the case of diastolic pressure. When the injections have been stopped, the pressure gradually rises and then become stabilized at the same value as the starting pressure. Between the stoppage of the injections and the stabilization, about one week elapsed.

The following conclusions may be drawn:
1. A treatment with the new kidney extract with an active dose greater than two maintenance doses, brings about by the second day a distinct reduction of the arterial pressure of the animals used in the experiment. This pressure reduction is maintained throughout and after treatment.
2. Depending upon the active dose employed and upon the maintenance doses, the pressure drop is either a lowering of the pressure (with strong doses) or simply a normalization of the pressure.
3. Sudden stoppage of the injections does not result in any stoppage of the action of the product. This action continues for a time varying in accordance with the doses employed.

4. No trouble was observed either before or after the stoppage of the injections in the animals. No loss of weight and no loss of appetite occurred.

5. Doses which are smaller or larger than the aforesaid doses may be administered, and repeated treatments may be carried out for the final stabilization.

Tables I and II show the variations of pressure as a function of time in the two series of measurements described above.

TABLE I

Variation of arterial pressure as a function of time in monkeys in experimental hypertension.

| Days | Blood Pressure Systolic-diastolic | Dose injected |
|---|---|---|
| 1 | 13 – 17 | 90 mg/kg |
| 2 | 11 – 16 | 30 mg/kg |
| 3 | 10 – 15 | 30 mg/kg |
| 4 | 9 – 14 | 30 mg/kg |
| 5 | 9 – 13 | 30 mg/kg |
| 6 | 9 – 13 | 30 mg/kg |
| 7 | 9 – 13 | None |
| 8 | 9 – 13 | None |
| 9 | 9 – 12 | None |
| 10 | 9 – 12 | None |
| 11 | 10 – 13 | None |
| 12 | 10 – 13 | None |
| 13 | 10 – 13 | None |
| 14 | 9 – 12 | None |
| 15 | 11 – 13 | None |
| 16 | 12 – 14 | None |
| 17 | 12 – 14 | None |
| 18 | 12 – 15 | None |
| 19 | 12 – 15 | None |
| 24 | 12 – 15 | None |

TABLE II

Variation of pressure as a function of time

| Days | Blood pressure Systolic-diastolic | Dose injected |
|---|---|---|
| 1 | 13 – 16 | 45 mg/kg |
| 2 | 12 – 16 | 15 mg/kg |
| 3 | 12 – 16 | 15 mg/kg |
| 4 | — | 15 mg/kg |
| 5 | 11 – 13 | 15 mg/kg |
| 6 | 11 – 13 | None |
| 7 | 11 – 13 | None |
| 8 | 12 – 15 | None |
| 9 | 12 – 16 | None |
| 10 | 12 – 16 | None |

Each day, the pressure is measured just before the injections are made, approximately at the same hour each time.

COMPARISON EXAMPLE a. Acetone extraction.

19.5 kg of ground pig kidney are treated with a solution of 39 liters of acetone and 63 ml of pure HCl at 2 ° C. Stirring is effected for 15 min., then the mixture is left for 17 hours at 2 ° C. After centrifugation at 550 r.p.m. for 30 min., 40 liters of filtrate and 12.4 kg of residue are collected. The residue is taken up with 8.580 liters of acetone and 4.290 liters of distilled water, stirring is effected for 15 min. at 2 ° C, then the mixture is left for 23 hours at 2 ° C. After centrifugation at 550 r.p.m. for 15 min., 12.5 liters of filtrate and 12.4 kg of residue are collected. This second residue treated as for the preceding one gives 12.5 liters of filtrate and 11.200 kg of residue after centrifugation.

All the three filtrates (65 l) are distilled in vacuo at a temperature at the most equal to 40 ° C for 5 ½ hours and a volume of about 9 liters is obtained, then the mixture is left for 5 days at 2 ° C. Filtering is effected and 6.26 liters are collected which are concentrated at 35 ° C in vacuo for 3 ½ hours. After filtration, 3.4 liters of extract are collected containing in dry weight 13.2 g/kg of kidney (7.5 percent by weight of the initial ground kidney). This volume is divided into two equal parts in order to be able to compare the influence of the replacement of the diethyl ether by the petroleum ether on the antihypertensive activity.

b. Treatment with diethyl ether then with sec-butanol.

1.7 liters of the filtrate obtained at the end of the treatment according to a) were treated as indicated in Example 1. A crude extract, hereinafter called "B," is obtained.

c. Treatment with petroleum ether then with sec-butanol.

The 1.7 liters remaining from the filtrate according to (a) are treated as indicated in the article by Hamilton and Grollman [J. Biol. Chem. 233, 529–9(1958) ]: three extractions with 170 ml petroleum ether, then 20 extractions of the lower aqueous layer with 97.5 ml of sec-butanol, concentration up to about 1/7th of the initial volume of the combined sec-butanol extracts, rest at 2 ° C for one night, filtration, treatment of the filtrate with an equal volume of distilled water, distillation in vacuo at 40 ° C, finally concentration to about 100 ml. A crude extract, hereinafter called "C," is obtained.

d. Comparison of the B and C extracts.

The physical (fluorescence) and pharmacological properties of the extracts B and C were compared.

B is fluorescent when it is irradiated with a radiation of 259 m$\mu$, on the contrary C is not fluorescent in ultraviolet light.

The average drop in blood pressure (systolic and diastolic) was studied in four batches of 10 rats each, the animals being experimentally hypertensive. The measurements shown in Table III show that B is more active than C.

TABLE III

|  | Average drop in blood pressure | |
|---|---|---|
|  | systolic | diastolic |
| extract B | – 2.1 | – 2.3 |
| extract C | – 0.6 | – 1.1 |

The difference in activity of B and C is due to the different nature of the extracts which have been obtained according to the invention on the one hand, and, according to Hamilton and Grollman on the other hand. Petroleum ether, called ether because of its volatile properties, is composed of saturated carbides, particularly n-hexane (B.P. 68 ° C) and n-pentane (B.P. 34°–36 ° C), while in diethyl ether ($CH_3$—$CH_2$—O—$CH_2$—$CH_3$) the presence of oxygen confers solvatation properties which are different from those of the saturated carbides. The use of one or the other, by reason of their different chemical structure, gives selective fractionations, the one not being replaceable by the other since the solvatation, i.e., the association of dissolved substances with the molecules of the solvent, is specific.

What is claimed is:

1. A process for the preparation of an antihypertensive kidney extract which comprises
   (i) concentrating in vacuo from about 1/9 to 1/30 of their volume the combined extracts obtained by treating 1 kg of pig kidney with 2 liters of acetone at a pH of about 4.0, subjecting the filtered residue to at least one extraction with a mixture of 440 ml of acetone and 220 ml of water,
   (ii) treating at least once the concentrate thus obtained with 10 to 50 ml of diethyl ether,
   (iii) distilling off in vacuo the diethyl ether from the combined solutions,
   (iv) extracting at a pH of about 5.0 at least once the residual solution with 10 to 50 ml of sec-butanol at a temperature maintained between 0° and 5° C, and
   (v) concentrating the active ingredient from the combined sec-butanol solutions by removing the sec-butanol by evaporation under vacuum at a temperature of about 35°–40° C; said extract being fluorescent when exposed to a 259 $\mu$ radiation.

2. A therapeutic composition containing in association with a pharmaceutically acceptable carrier from 1 to 95 percent by weight of a kidney extract as claimed in claim 1.

3. A method of treating hypertension in mammals which comprises injecting an antihypertensive effective amount of a composition containing in 5 ml of physiological saline from 20 mg to 50 mg of the antihypertensive kidney extract of claim 1 and 80 mg to 50 mg of lactose, respectively, for at least 15 days.

4. The method of claim 3 wherein the composition contains 20 mg of said kidney extract and is injected three times a day.

* * * * *